(12) United States Patent
Maeda et al.

(10) Patent No.: US 10,112,507 B2
(45) Date of Patent: Oct. 30, 2018

(54) SEAT RECLINING APPARATUS

(71) Applicant: SHIROKI CORPORATION, Fujisawa-shi, Kanagawa (JP)

(72) Inventors: Noriaki Maeda, Fujisawa (JP); Hidehiko Fujioka, Fujisawa (JP)

(73) Assignee: SHIROKI CORPORATION, Fujisawa-shi, Kanagawa (JP)

( * ) Notice: Subject to any disclaimer, the term of this patent is extended or adjusted under 35 U.S.C. 154(b) by 0 days.

(21) Appl. No.: 15/673,062

(22) Filed: Aug. 9, 2017

(65) Prior Publication Data

US 2018/0043800 A1 Feb. 15, 2018

(30) Foreign Application Priority Data

Aug. 10, 2016 (JP) .................................. 2016-157204

(51) Int. Cl.
*B60N 2/235* (2006.01)
*B60N 2/20* (2006.01)

(52) U.S. Cl.
CPC ............. *B60N 2/2356* (2013.01); *B60N 2/20* (2013.01)

(58) Field of Classification Search
CPC ................................. B60N 2/20; B60N 2/2356
USPC ...................................................... 297/367 P
See application file for complete search history.

(56) References Cited

U.S. PATENT DOCUMENTS

| 8,002,353 B2 | 8/2011 | Yamada et al. | |
| 2003/0230923 A1* | 12/2003 | Uramichi | B60N 2/236 297/367 R |
| 2011/0018325 A1 | 1/2011 | Yamada et al. | |
| 2011/0169314 A1* | 7/2011 | Tanguy | B60N 2/236 297/367 P |
| 2015/0084392 A1* | 3/2015 | Chang | B60N 2/2356 297/367 P |
| 2015/0321585 A1* | 11/2015 | McCulloch | B60N 2/2358 297/367 P |

FOREIGN PATENT DOCUMENTS

JP 2010-042239 A 2/2010

* cited by examiner

*Primary Examiner* — Milton Nelson, Jr.
(74) *Attorney, Agent, or Firm* — Buchanan Ingersoll & Rooney PC

(57) ABSTRACT

The seat reclining apparatus includes first and second pawls supported by a base member to be movable in radial directions and to be engageable with an internal gear of a ratchet. In the unlocked range, a first pawl-restriction portion of the ratchet and a first limit portion of the first pawl, which are positioned on the radially outer side, radially face, and each pawl is prevented from engaging with the internal gear. In a specific range of the unlocked range, a second pawl-restriction portion of the ratchet and a second limit portion of the second pawl, which are positioned on the radially inner side, radially face. The second pawl-restriction portion or/and the second limit portion includes a pressing portion which moves the second pawl to a disengaged position when the second-pawl restriction portion and the second limit portion mutually contact in the rotational direction of the ratchet.

4 Claims, 12 Drawing Sheets

SEAT RECLINING APPARATUS

BACKGROUND OF THE INVENTION

1. Field of the Invention

The present invention relates to a seat reclining apparatus which is installed in a seatback-angle adjustable reclining seat.

2. Description of the Related Art

A type of reclining apparatus which includes: a base plate (lower arm) which is fixed to a seat cushion frame of a reclining seat; a ratchet plate (upper arm) which is fixed to a seatback frame of the reclining seat and provided on the inner periphery thereof with an annular internal gear (toothed portion); and pawls (a plurality of pawls are provided at different positions in the circumferential direction) which are supported to be movable relative to the base plate in radial directions of the base plate, wherein the reclining seat is brought into a locked state, in which the ratchet plate and the base plate are prevented from rotating relative to each other, by bringing the outer toothed portion which is formed on each pawl into mesh with the internal gear of the ratchet plate, is widely used as a reclining apparatus provided between a seat cushion frame and a seatback frame of a reclining seat. Each pawl is biased in a locking direction (radially outward) to bring the outer toothed portion thereof into mesh with the internal gear of the ratchet plate by a biaser such as a spring (s), and the reclining seat is brought into an unlocked state by moving each pawl in a lock releasing direction (radially inward) using a cam member or the like against the biasing force of the biaser.

There is known a seat reclining apparatus of this type equipped with a mechanism that restricts movement of each pawl in the locking direction when the ratchet plate is in a predetermined angular range relative to the base plate (e.g., Japanese Unexamined Patent Publication 2010-42239). The ratchet plate is provided with pawl restriction portions which face radially inward and each pawl is provided with a projection-shaped limit portion which is capable of coming into contact with the associated pawl restriction portion from the radially inner side, as the pawl movement restricting mechanism. When the positional relationship between the limit portions and the pawl restriction portions is such that the limit portions and the pawl restriction portions are aligned (mutually face) radially, the amount of movement of each pawl in the radially outward direction is restricted by contact of the limit portion thereof with the associated pawl restriction portion, so that the outer toothed portion of each pawl does not mesh with the internal gear of the ratchet plate. Accordingly, the ratchet plate is allowed to rotate relative to the base plate. When the positional relationship between the limit portions and the pawl restriction portions is such that the limit portions and the pawl restriction portions are not aligned (do not mutually face) radially, the limit portions do not come in contact with pawl restriction portions, which allows each pawl to move to a position at which the outer toothed portion thereof meshes with the internal gear of the ratchet plate. The angular range of the ratchet plate in which the limit portions and the pawl restriction portions are not radially aligned refers to the locked range, and the angular range of the ratchet plate in which the limit portions and the pawl restriction portions are radially aligned refers to the unlocked range.

Upon the ratchet plate rotating within the unlocked range, the limit portions slide against the pawl restriction portions. When the ratchet plate moves from the unlocked range to the locked range, the biasing force exerted on the pawls causes the pawls to be pushed radially outward upon the limit portions reaching ends of the pawl restriction portions in the circumferential direction. The contact range (contact area) between each limit portion and the associated pawl restriction portion in the circumferential direction becomes reduced at an angle before the limit portion reaches the circumferential end of the associated pawl restriction portion. In this state, if each pawl is pressed radially outward by an external force or the like, there is a possibility of the pressing force being concentrated on the narrow contact range between each limit portion and the associated pawl restriction portion and thus imposing an excessive load thereon.

The pawls can be prevented from being deformed by dispersing the aforementioned pressing force by providing each of the plurality of pawls with the limit portion and increasing the number of the limit portions and the number of the pawl restriction portions which come in contact with each other in the unlocked range of the ratchet plate. On the other hand, if the number of the limit portions of the pawls and the number of the pawl restriction portions of the ratchet plate increase, the circumferential space for the formation of each limit portion and each pawl restriction portion increases, which causes the range of movement of the ratchet plate in the rotational direction (the operating amount of the seatback), which corresponds to the sum of the locked range and the unlocked range of the ratchet plate, to decrease.

SUMMARY OF THE INVENTION

An object of the present invention is to provide a seat reclining apparatus which can move the seatback by a great amount of movement though the internal structure is superior in strength.

According to an aspect of the present invention, a seat reclining apparatus is provided, including: a base member provided on one of a seat cushion and a seatback; a ratchet provided on the other of the seat cushion and the seatback, provided with an internal gear and allowed to rotate relative to the base member; a first pawl which is supported to be movable relative to the base member in a radial direction about a rotation center point of the ratchet and moves between an engaged position, in which the first pawl is engaged with the internal gear, and a disengaged position, in which the first pawl is disengaged from the internal gear, the first pawl including a first limit portion; and a second pawl which is supported to be movable relative to the base member in a radial direction about the rotation center point of the ratchet and moves between an engaged position, in which the second pawl is engaged with the internal gear, and a disengaged position, in which the second pawl is disengaged from the internal gear, the second pawl including a second limit portion. The ratchet includes a first pawl-restriction portion which restricts movement of the first pawl to the engaged position by contact with the first limit portion and a second pawl-restriction portion which restricts movement of the second pawl to the engaged position by contact with the second limit portion. The second limit portion is positioned closer to the radially inner side than the first limit portion and the second pawl-restriction portion is positioned closer to the radially inner side than the first pawl-restriction portion. In the unlocked range, in which the ratchet can always rotate relative to the base member with the first pawl-restriction portion and the first limit portion radially facing each other, the second pawl-restriction portion and the second limit portion radially face each other in a specific range that is a portion of the unlocked range. At least one of the second-pawl restriction portion and the second limit portion includes a pressing portion which moves the second pawl to the disengaged position when the one of the second pawl-restriction portion and the second limit portion comes in contact with the other of the second pawl-restriction portion and the second limit portion in a rotational direction of the ratchet.

According to this structure, in the specific range, which is a portion of the unlocked range of the ratchet, a radial force can be received by the second limit portion of the second pawl in addition to the first limit portion of the first pawl, which makes it possible to improve load bearing performance. In addition, since the second limit portion and the second pawl-restriction portion are positioned closer to the radially inner side than the first limit portion and the first pawl-restriction portion, respectively, the second pawl can be moved to the engaged position even if the ratchet is rotated to a position at which the second limit portion and the first pawl-restriction portion radially face each other, which makes it possible to increase the range of rotation of the ratchet. Additionally, since the second pawl is moved toward the disengaged position by the pressing portion when the second pawl-restriction portion and the second limit portion come in contact with each other in the rotational direction of the ratchet, the contact between the second pawl-restriction portion and the second limit portion does not interfere with rotation of the ratchet, which makes it possible to achieve reliable operation.

The pressing portion can be configured of an inclined surface provided on the second pawl-restriction portion. As an example, it is advisable that the second pawl-restriction portion be provided with a holding surface which holds the second pawl in the disengaged position and a standing wall surface for positioning the holding surface closer to the radially inner side than the first pawl-restriction portion and that the inclined surface be provided between the holding surface and the standing wall surface.

With the second limit portion formed as a projection which projects from the second pawl so that the longitudinal direction of this projection extends in the rotational direction of the ratchet, this projection can be provided, at one end thereof in the longitudinal direction, with a circular-arc-shaped surface capable of coming into contact with the inclined surface of the second pawl-restriction portion.

As described above, according to the prevent invention, a seat reclining apparatus, which moves the seatback by a great amount of movement though the internal structure is superior in strength, can be achieved.

The present disclosure relates to subject matter contained in Japanese Patent Application No. 2016-157204 (filed on Aug. 10, 2016) which is expressly incorporated herein by reference in its entirety.

DESCRIPTION OF EMBODIMENT

An embodiment according to the present invention will be hereinafter discussed with reference to the accompanying drawings. The leftward and rightward directions in the following description correspond to the directions shown by the arrows "Left" and "Right", respectively, shown in FIGS. 2 and 10, and the term "right side" refers to the vehicle exterior side and the term "left side" refers to the vehicle interior side in a reclining seat 10 for vehicle and a seat reclining apparatus 15 in the present embodiment. In addition, the term "inner peripheral side" refers to the radial center side (radially inner side) of the seat reclining apparatus 15 and the term "outer peripheral side" refers to the radially opposite side (radially outer side) of the seat reclining apparatus 15 from the radial center side thereof.

Figure 1:
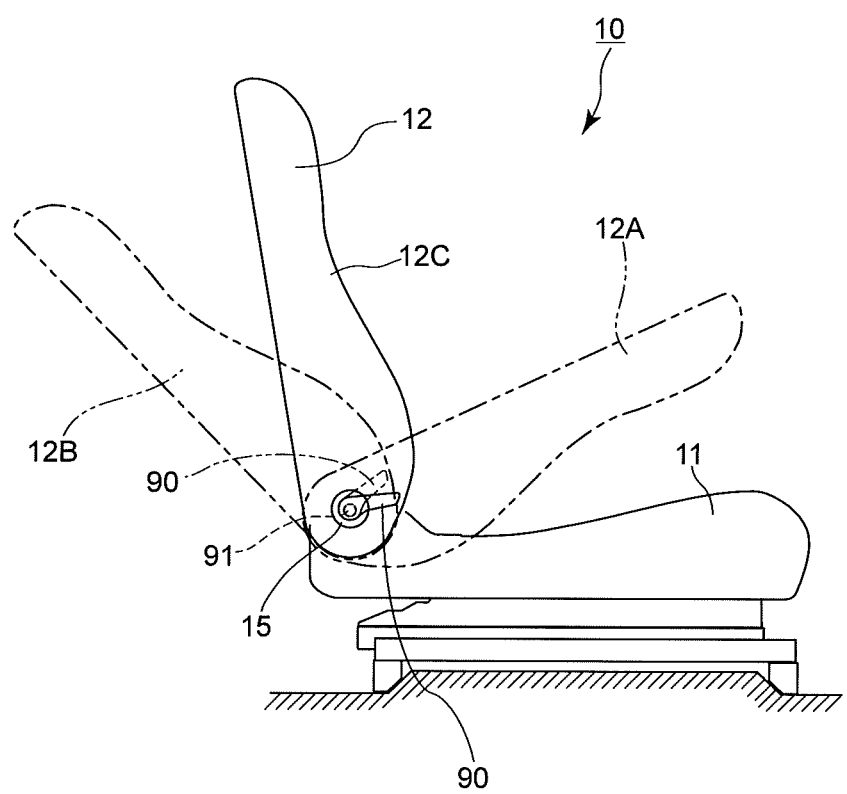
FIG. 1 is a side elevational view of a reclining seat.

The reclining seat 10 for vehicle shown in FIG. 1 constitutes a right-side seat with respect to the direction in which the vehicle moves and is provided with a seat cushion 11 which is supported by a vehicle interior floor of a vehicle via a seat rail, and a seatback 12 which is tiltable relative to the rear of the seat cushion 11. The reclining seat 10 is provided thereinside with a forward-tilting biasing spring (not shown) which rotationally biases the seatback 12 forward with respect to the seat cushion 11.

A pair of left and right seat cushion frames (not shown) are provided inside the seat cushion 11, and a pair of left and right rear frames (not shown) which project upward are provided in a fixed state at the back of the seat cushion 11. A pair of left and right seatback frames (not shown) are provided inside the seatback 12. The pair of left and right seatback frames are positioned between the left and right rear frames, and the left seatback frame and the left rear frame face against each other in the leftward and rightward directions (vehicle widthwise direction) and the right seatback frame and the right rear frame face against each other in the leftward and rightward directions. On the left side (vehicle interior side) of the reclining seat 10, the left rear frame and the left seatback frame are rotatably connected via a rotational connection shaft (not shown in the drawings).

On the other hand, on the right side (vehicle exterior side) of the reclining seat 10 that can be seen in FIG. 1, the seat reclining apparatus 15 that connects the right rear frame and the right seatback frame in a manner to allow the right rear frame and the right seatback frame to rotate about an axis extending in the leftward and rightward directions is installed between the right rear frame and the right seatback frame.

The seatback 12 is rotatable about the aforementioned rotational connection shaft and the seat reclining apparatus 15 relative to the seat cushion 11. Specifically, the seatback 12 is tiltable between a forwardly-tilted position 12A and a rearward-tilted position 12B that are shown in FIG. 1. Although the structure of the reclining apparatus 15 will be discussed later, the section ranging from a first-stage (initial-stage) locked position 12C shown in FIG. 1 to the rearward-tilted position 12B shown in FIG. 1 is a locked range in which the angle of the seatback 12 can be latched by the seat reclining apparatus 15 entering a locked state. In the locked range, the angle of the seatback 12 can be adjusted by temporarily releasing the locked state by performing an unlocking operation on the seat reclining apparatus 15. The section ranging from the forwardly-tilted position 12A to a position immediately in front of the first-stage locked position 12C is an unlocked range in which the seat reclining apparatus 15 cannot be brought into a locked state.

Figure 2:
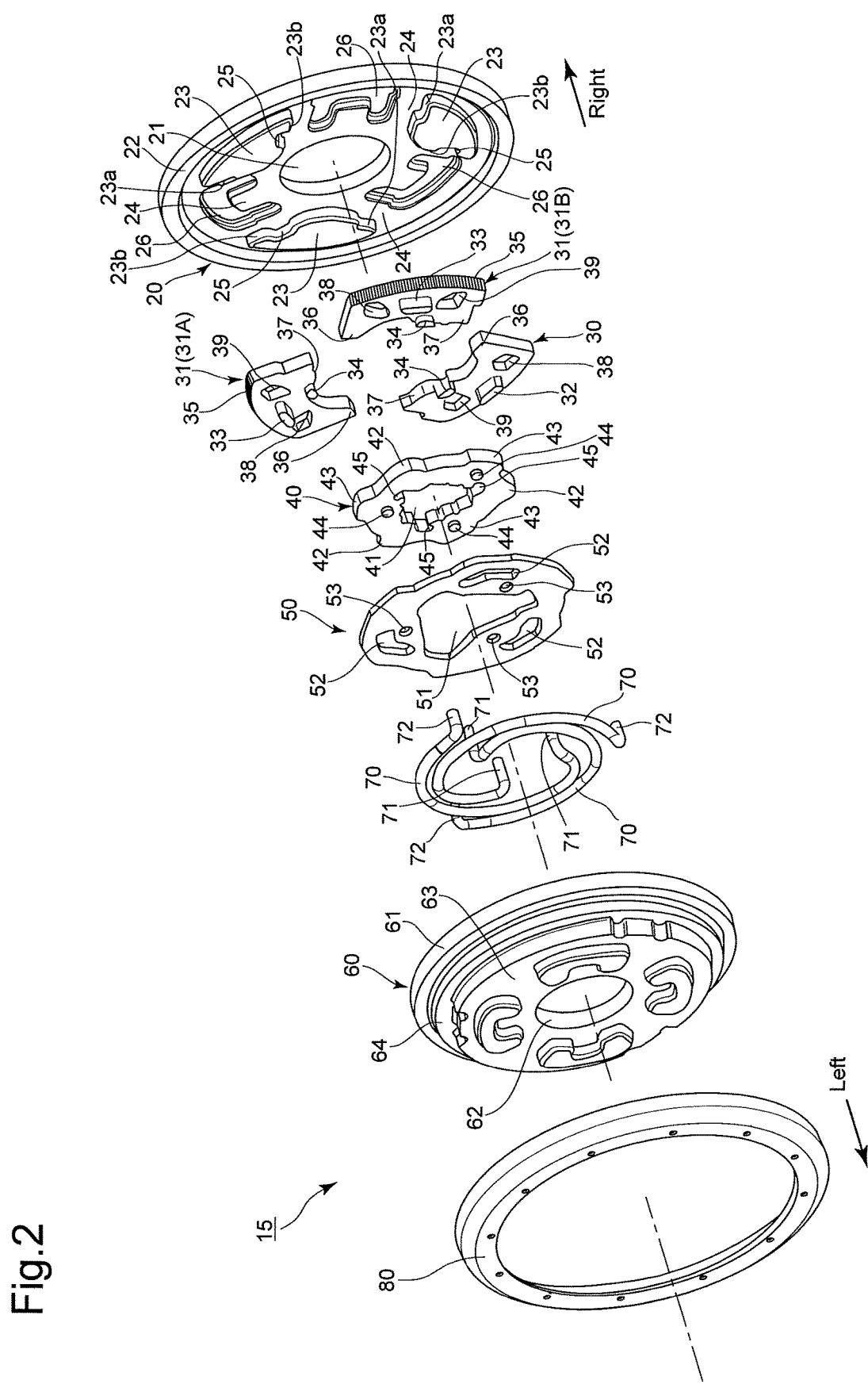
FIG. 2 is an exploded perspective view of a seat reclining apparatus.

Subsequently, the detailed structure of the seat reclining apparatus 15 will be hereinafter discussed with reference to FIG. 2 onward. As shown in FIG. 2, the seat reclining apparatus 15 is provided with a base plate (base member) 20, a first pawl 30, two second pawls 31, a rotational cam 40, a release plate 50, a ratchet plate (ratchet) 60, lock springs 70 and a retaining ring 80, which are major elements of the seat reclining apparatus 15.

The base plate 20 is a metal disk member which is formed by press molding. As shown in FIG. 2, the base plate 20 is provided in the center thereof with a shaft insertion hole 21 formed as a through-hole which is circular in cross sectional shape. The base plate 20 is provided on the outer edge of the left side thereof with a large-diameter annular flange 22 and has an accommodation space which is formed inside the large-diameter annular flange 22. The base plate 20 is provided on the left side thereof with three groove-forming projections 23 which are projected and arranged at equi-angular intervals (intervals of 120 degrees) in the circumferential direction about the shaft insertion hole 21. Each groove-forming projection 23 is substantially in the shape of a sector having an increasing circumferential width thereof with respect to a direction from the inner peripheral side to the outer peripheral side, and a circular-arc-shaped clearance is formed between the outer peripheral surface of each groove-forming projection 23 and the large-diameter annular flange 22. Both side surfaces of each groove-forming projection 23 with respect to the circumferential direction of the base plate 20 are formed as flat guide surfaces 23a and 23b. The adjacent flat guide surfaces 23a and 23b of any two groove-forming projections 23 are substantially parallel to each other, and a guide groove 24 is formed therebetween. A spring-engaging recess 25 is formed on each groove-forming projection 23 at the midpoint of the flat guide surface 23b. The base plate 20 is further provided in each of the three guide grooves 24 with a pawl guide recess 26 which is greater in depth than the base of the guide groove 24.

Figure 12:
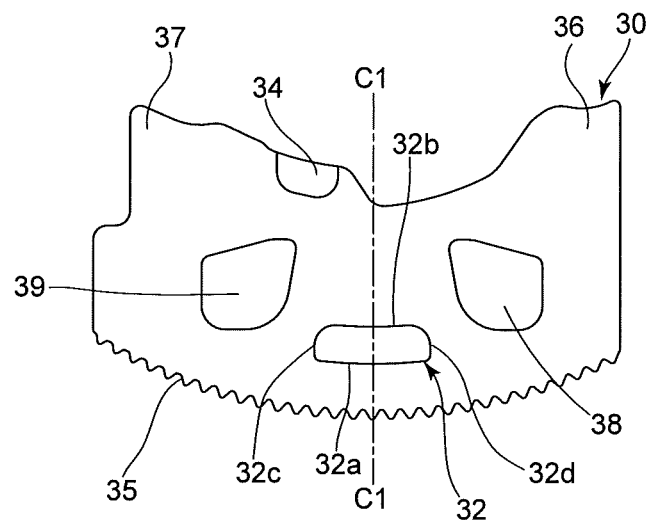
FIG. 12 is a side elevational view of the first pawl.
Figure 13:
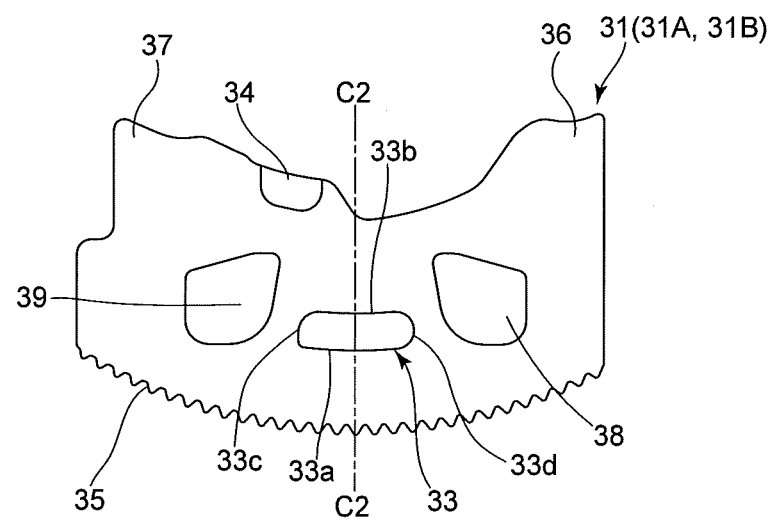
FIG. 13 is a side elevational view of the second pawl.

The seat reclining apparatus 15 is provided with the first pawl 30 and the two second pawls 31 (a second pawl 31A and a second pawl 31B), each of which is a press-molded product molded of a metal plate. The first pawl 30 and the two second pawls 31 are installed in the three guide grooves 24 of the base plate 20, respectively. As shown in FIGS. 12 and 13, the first pawl 30 and each second pawl 31 are provided with a holding projection (first limit portion) 32 and an auxiliary holding projection (second limit portion) 33, respectively, which are mutually different in shape and location. Except this difference, the first pawl 30 and each second pawl 31 are identical in structure. Portions of the first pawl 30 and the second pawls 31 which are identical in structure are designated by the same reference numerals. The second pawl 31A and the second pawl 31B are identical in structure. In FIGS. 3 through 8, the most part of the second pawl 31B is not shown except for the auxiliary holding projection 33.

As shown in FIGS. 12 and 13, the first pawl 30 and the second pawls 31 are each provided, on both sides thereon with respect to the circumferential direction, with two surfaces slidable on the associated flat guide surfaces 23a and 23b therealong. The first pawl 30 is provided on the left side surface thereof with the holding projection 32 and a cam follower 34, while each second pawl 31 is provided on the left side surface thereof with the auxiliary holding projection 33 and a cam follower 34. The first pawl 30 and the second pawls 31 are each provided on the circular-arc-shaped outer peripheral surface thereof with an outer toothed portion 35. The first pawl 30 and the second pawls 31 are each provided on the inner peripheral surface thereof with a restricted portion 36 and a pressed portion 37, each of which projects toward the radially inner side. The first pawl 30 and the second pawls 31 are each provided on the right side thereof with a pair of guide projections 38 and 39.

As shown in FIG. 12, the holding projection 32 of the first pawl 30 is a projection the longitudinal direction of which extends in the circumferential direction (the rotational direction of the ratchet plate 60 relative to the base plate 20), and is provided with an outer side surface 32a which faces radially outward, an inner side surface 32b which faces radially inward, and connecting surfaces 32c and 32d which are positioned on both sides of the holding projection 32 in the circumferential direction. The outer side surface 32a is a gently-curved convex circular arc surface and the inner side surface 32b is a gently-curved concave circular arc surface. The holding projection 32 has a substantially symmetrical shape with respect to a center line C1 (FIG. 12) which passes through the center of the holding projection 32 with respect to the circumferential direction and extends in a radial direction of the base plate 20. Accordingly, the connecting surfaces 32c and 32d are also substantially symmetrical in shape with respect to the center line C1.

As shown in FIG. 13, the auxiliary projection 33 of each second pawl 31 is a projection the longitudinal direction of which extends in the circumferential direction (the rotational direction of the ratchet plate 60 relative to the base plate 20), and is provided with an outer side surface 33a which faces radially outward, an inner side surface 33b which faces radially inward, and connecting surfaces 33c and 33d which are positioned on both sides the auxiliary holding projection 33 in the circumferential direction. The outer side surface 33a is a gently-curved convex circular arc surface and the inner side surface 33b is a gently-curved concave circular arc surface. The auxiliary holding projection 33 has an asymmetrical shape with respect to a center line C2 (FIG. 13) which passes through the center of the auxiliary holding projection 33 with respect to the circumferential direction and extends in a radial direction of the base plate 20. Specifically, the connecting surface 33c is substantially identical in shape to the connecting surface 32c of the holding projection 32, and the auxiliary holding projection 33 has an angular portion, ranging from the outer side surface 33a to the connecting surface 33c. On the other hand, the connecting surface 33d is a convex circular arc surface which protrudes in the circumferential direction and is connected smoothly to each of the outer side surface 33a and the inner side surface 33b while being curved.

As shown in FIGS. 12 and 13, the auxiliary holding projection 33 of each second pawl 31 is positioned closer to the radially inner side than the holding projection 32 of the first pawl 30. More specifically, in the case where an imaginary addendum circle that connects the outermost points of the teeth of the outer toothed portion 35 is set, the distance from the addendum circle to the outer side surface 33a of each auxiliary holding projection 33 is greater than the distance from the addendum circle to the outer side surface 32a of the holding projection 32.

The first pawl 30 and the second pawls 31 are installed in the three guide grooves 24, respectively, in a manner as shown in FIGS. 3 through 8. Although only one of the two second pawls 31 is shown in FIGS. 3 through 8, the other second pawl 31, which is not shown in the drawings, is also installed in the associated guide groove 24 similarly and operates similarly to the second pawl 31 shown in the drawings. The first pawl 30 and the second pawls 31 are each in surface contact with the base surface (left side surface) of the associated guide groove 24 to be supported thereby. Each pawl 30 and 31 can move in a radial direction of the base plate 20 in the associated guide groove 24 along the flat guide surfaces 23a and 23b of the associated groove-forming projections 23. Each of the first pawl 30 and the second pawls 31 moves radially between an engaged position on the outer peripheral side (FIG. 3), in which each pawl 30 and 31 is spaced from the shaft insertion hole 21 of the base plate 20, and a disengaged position on the inner peripheral side (FIG. 4), in which each pawl 30 and 31 is positioned close to the shaft insertion hole 21. Between each pawl 30 and 31 and the associated two adjacent flat guide surfaces 23a and 23b that are positioned at either side of this pawl is secured a clearance to the extent that each pawl 30 and 31 is allowed to slide smoothly in a radial direction of the base plate 20 and is prevented from rattling excessively.

Figure 10:
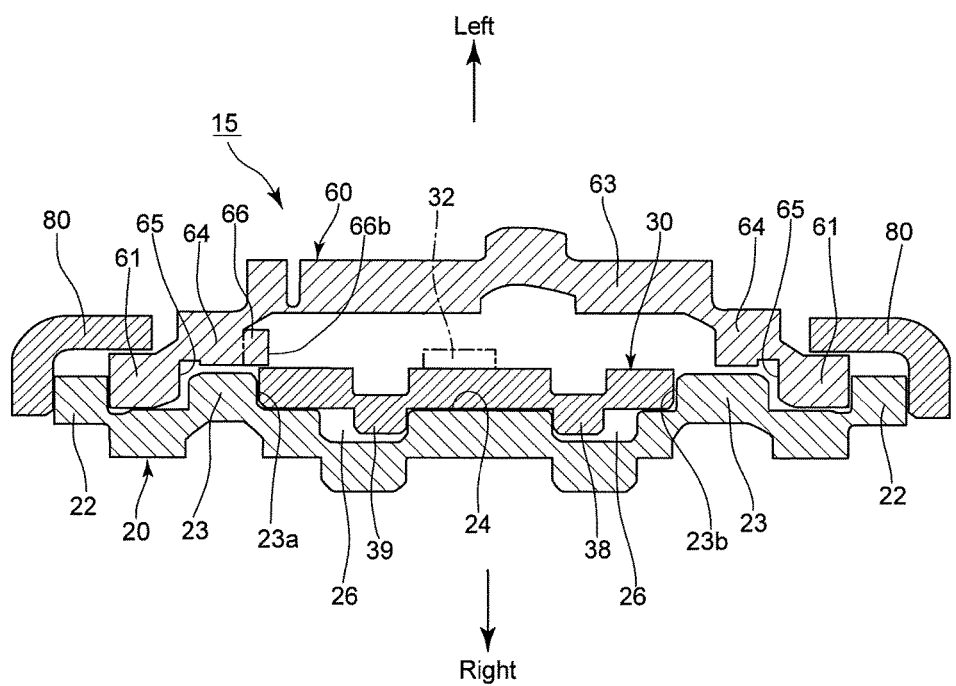
FIG. 10 is a sectional view taken along the X-X arrow line shown in FIG. 3.

As shown in FIG. 10, with the first pawl 30 supported in the associated guide groove 24 (with each second pawl 31 also supported in the associated guide groove 24 in a similar manner though not shown in FIG. 10), the pair of guide projections 38 and 39, which are provided on the first pawl 30 (each second pawl 31), are inserted into the associated pawl guide recess 26. Each guide projection 38 and 39 is inserted into the associated pawl guide recess 26 with a clearance allowing each pawl 30 and 31 to move radially relative to the associated pawl guide recess 26 while being guided by the associated flat guide surfaces 23a and 23b without interference (namely, with a clearance greater than that between each pawl 30 and 31 and the associated flat guide surfaces 23a and 23b).

When an excessive load is radially exerted on the first pawl 30 and the second pawls 31, each guide projection 38 and 39 and the inner surface of the associated pawl guide recess 26 come in contact with each other to thereby create a component of force that presses the associated pawl 30 or 31 toward the engaged position. As a result, even when an extremely large force in a tilting direction which may tilt or deform each pawl 30 and 31 is exerted on the seat reclining apparatus 15 (even when a force in a direction different from the direction in which each pawl 30 and 31 is guided by the associated guide groove 24 is exerted on this pawl) in the locked range of the seatback 12, the engagement between each outer toothed portion 35 and the internal gear 65 can be reliably maintained, which makes it possible to achieve high level of safety.

The rotational cam 40 is a press-molded product molded of a metal plate and substantially identical in thickness to each pawl 30 and 31. As shown in FIGS. 2 through 8, the rotational cam 40 is provided in the center thereof with a non-circular center hole 41, which is formed as a through-hole. The rotational cam 40 is provided on the outer periphery thereof with three restrictor portions 42 and three pressing portions 43. The three restrictor portions 42 and the three pressing portions 43 are disposed at substantially equi-angular intervals in the circumferential direction, respectively. The rotational cam 40 is further provided, at substantially equi-angular intervals in the circumferential direction, with three rotation stop projections 44. As shown in FIG. 2, the rotation stop projections 44 project leftward. The rotational cam 40 is provided, in the non-circular center hole 41 at substantially equi-angular intervals in the circumferential direction, with three spring-engaging recesses 45. The rotational cam 40 is installed in the center of the accommodation space of the base plate 20, and the first pawl 30 and the second pawls 31 are positioned radially outside the rotational cam 40 (see FIGS. 3 through 8).

The release plate 50 is a press-molded product molded of a metal plate and provided, at substantially equi-angular intervals in the circumferential direction around a center hole 51, with three cam holes 52 which are formed as through-holes. As shown in FIGS. 3 through 8, the center hole 51 is greater in size than the non-circular center hole 41 of the rotational cam 40. Each cam hole 52 is provided with a lock-allowing portion 52a and an unlocking portion 52b. The lock-allowing portion 52a of each cam hole 52 is formed on the radially outer side at a position far from the center hole 51, and the unlocking portion 52b of each cam hole 52 is formed on the radially inner side at a position close to the center hole 51. The release plate 50 is further provided, at equi-angular intervals in the circumferential direction, with three rotation stop holes 53.

The release plate 50 is coupled to the rotational cam 40 by fitting the three rotation stop projections 44 into the three rotation stop holes 53. The rotational cam 40 and the release plate 50 are prevented from rotating relative to each other by the engagement between the three rotation stop projections 44 and the three rotation stop holes 53, so that the rotational cam 40 and the release plate 50 integrally rotate as one. In addition, the cam followers 34 of the first pawl 30 and the second pawls 31 are inserted into the three cam holes 52 of the release plate 50. The first pawl 30 and the second pawls 31 are prevented from moving radially inward beyond the positions thereof shown in FIG. 4 by engagement of the cam followers 34 with the unlocking portions 52b of the cam hole 52.

Figure 11:
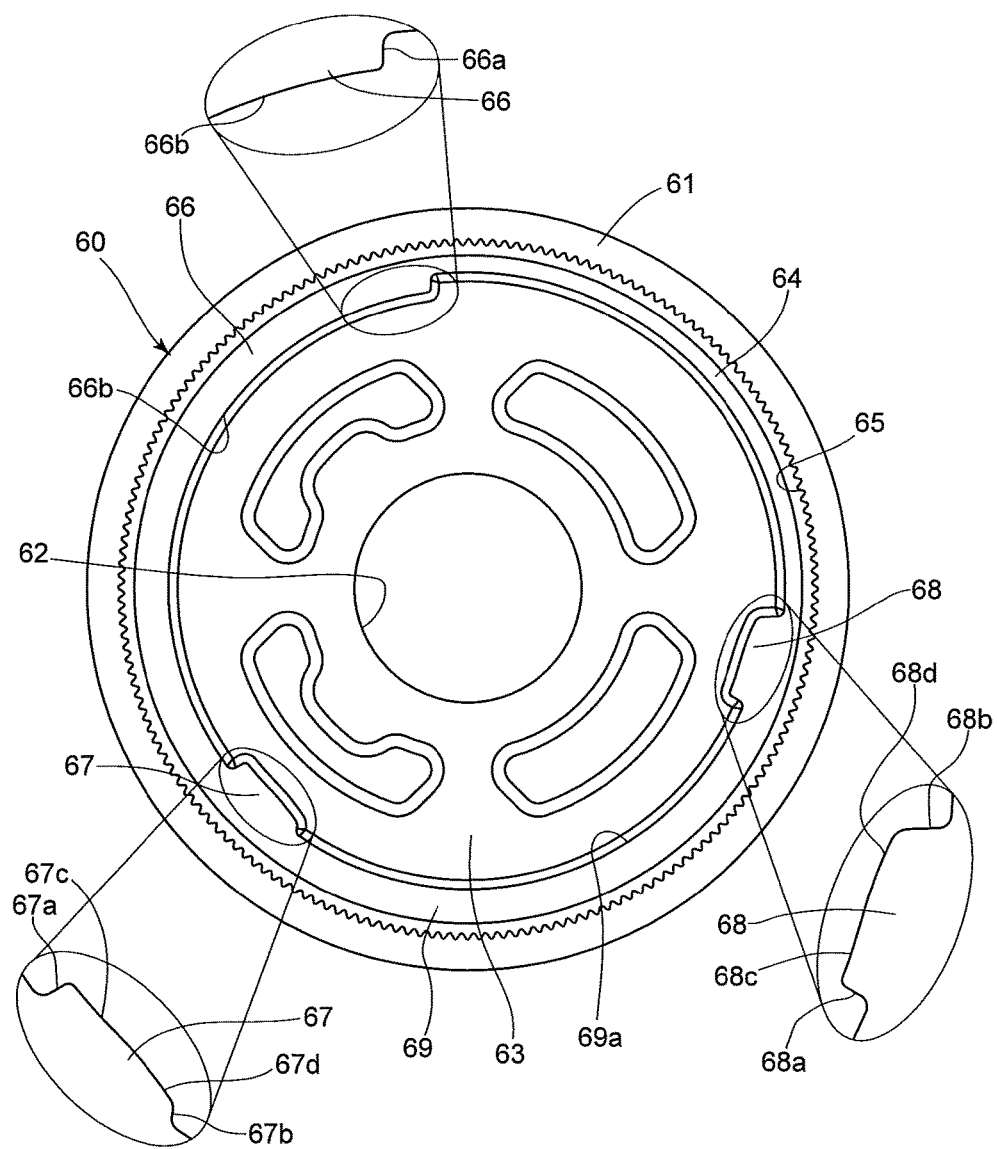
FIG. 11 is a side elevational view of the ratchet plate.

The ratchet plate 60, which is a disk member made of metal, is a press-molded product. The ratchet plate 60 is provided on the outer edge of the right side thereof with a small-diameter annular flange 61 having a circular shape, and an accommodation space is formed inside the small-diameter annular flange 61. As shown in FIGS. 2 and 11, the ratchet plate 60 is provided at the center thereof with a shaft insertion hole 62 formed as a through-hole which is circular in cross sectional shape. A radially innermost portion of the ratchet plate 60, which is positioned around the shaft insertion hole 62, is formed as a disk-shaped base portion 63. The ratchet plate 60 is provided at a radial position between the base portion 63 and the small-diameter annular flange 61 with an intermediate annular portion 64. As can be seen from FIG. 10, the intermediate annular portion 64 is positioned one step to the left of the small-diameter annular flange 61 and is smaller in diameter than the small-diameter annular flange 61. The base portion 63 is positioned one step to the left of the intermediate annular portion 64 and is smaller in diameter than the intermediate annular portion 64. As shown in FIGS. 10 and 11, the internal gear 65 is formed on the inner peripheral surface of the small-diameter annular flange 61. A first holding projection (first pawl-restriction portion) 66, a second holding projection (second pawl-restriction portion) 67, a third holding projection (second pawl-restriction portion) 68 and a connecting projection 69 are formed on the inner peripheral surface of the intermediate annular portion 64 at different positions in the circumferential direction. The first holding projection 66, the second holding projection 67, the third holding projection 68 and the connecting projection 69 each have a shape projecting radially inward from the intermediate annular portion 64.

As shown in FIG. 11, the first holding projection 66 is formed over the range from a step riser surface 66a thereof, which is positioned at one end of the first holding projection 66 in the circumferential direction, to the second holding projection 67, which is positioned at the other end of the first holding projection 66 in the circumferential direction, and the first holding projection 66 is provided with a holding surface 66b which is a surface on the inner peripheral side that connects the step riser surface 66a and the second holding projection 67. The holding surface 66b is a circular arc surface with the curvature center thereof on the center point of the ratchet plate 60.

As shown in FIG. 11, the second holding projection 67 is smaller in length in the circumferential direction than the first holding projection 66, and provided, at one end and the other end of the second holding projection 67 in the circumferential direction, with a step riser surface 67a and a standing wall surface 67b, respectively. The step riser surface 67a is connected to the holding surface 66b. The step riser surface 67a and the standing wall surface 67b have inclinations such that the distance therebetween decreases toward the radially inner side of the ratchet plate 60 from the radially outer side of the ratchet plate 60. The standing wall surface 67b is greater in inclination with respect to the radial direction of the ratchet plate 60 than the step riser surface 67a. A holding surface 67c which is continuous with the step riser surface 67a and a pressing surface (pressing portion/inclined surface) 67d which is continuous with the standing wall surface 67b are formed on the inner peripheral side of the second holding projection 67. Due to the radially inwardly protruding shapes of the step riser surface 67a and the standing wall surface 67b with respect to the intermediate annular portion 64, the holding surface 67c and the pressing surface 67d are arranged closer to the radially inner side than the holding surface 66b of the first holding projection 66. The holding surface 67c is a concave circular arc surface with the curvature center thereof on the center point of the ratchet plate 60. The pressing surface 67d is an inclined surface which increases the amount of projection toward the radially inner side of the ratchet plate 60 with respect to a direction away from the standing wall surface 67b toward the holding surface 67c. The holding surface 67c and the pressing surface 67d are smoothly connected.

As shown in FIG. 11, the shape of the third holding projection 68 is similar to the shape of the second holding projection 67. A step riser surface 68a and a standing wall surface 68b are formed at one end and the other end of the third holding projection 68 in the circumferential direction. A holding surface 68c and a pressing surface (pressing portion/inclined surface) 68d are formed on the inner peripheral side of the third holding projection 68. The step riser surface 68a, the holding surface 68c and the pressing surface 68d are identical in shape to the step riser surface 67a, the holding surface 67c and the pressing surface 67d of the second holding projection 67, respectively. The standing wall surface 68b is identical in inclination with respect to the radial direction of the ratchet plate 60 to the standing wall surface 67b and different from the standing wall surface 67b only in that the standing wall surface 68b is formed longer than the standing wall surface 67b in a direction toward the radially outer side. Due to the radially inwardly protruding shapes of the step riser surface 68a and the standing wall surface 68b with respect to the intermediate annular portion 64, the holding surface 68c and the pressing surface 68d are arranged closer to the radially inner side than the holding surface 66b of the first holding projection 66.

The step riser surface 66a of the first holding projection 66, the step riser surface 67a of the second holding projection 67 and the step riser surface 68a of the third holding projection 68 are positioned at substantially equi-angular intervals in the circumferential direction (at intervals of substantially 120 degrees about the center point of the ratchet plate 60). The first holding projection 66 is formed continuously over a long range in the circumferential direction from the step raiser surface 66a to the step riser surface 67a.

The connecting projection 69 is formed between the standing wall surface 67b of the second holding projection 67 and the step riser surface 68a of the third holding projection 68. The connecting projection 69 is provided with an inner peripheral surface 69a which is a circular arc surface with the curvature center thereof on the center point of the ratchet plate 60 and is the same diameter as the holding surface 66b of the first holding projection 66.

The ratchet plate 60 is installed to cover the left side of the base plate 20 with the small-diameter annular flange 61 inserted into the gap between the inner periphery of the large-diameter annular flange 22 and the outer peripheries of the groove-forming projections 23 (see FIG. 10). In this state, the outer toothed portions 35, which are provided on the first pawl 30 and the second pawls 31, and the internal gear 65 of the ratchet plate 60 radially face each other.

The three lock springs 70 (FIG. 2) are installed in the space between the ratchet plate 60 and the base plate 20. Each lock spring 70 is made of a curved metal wire. One end of each lock spring 70 is bent rightward to be formed into a first engaging portion 71, while the other end of the same is bent rightward to be formed into a second engaging portion 72. As shown in FIGS. 3 through 8, each lock spring 70 is installed by engaging the first engaging portion 71 in the associated spring-engaging recess 45 of the rotational cam 40 and engaging the second engaging portion 72 in the associated spring-engaging recess 25 of the base plate 20. When each lock spring 70 is installed onto the base plate 20 and the rotational cam 40 in this manner, each lock spring 70 is resiliently deformed to produce a biasing force that urges the rotational cam 40 to rotate in one direction. This biasing force is a force which urges the rotational cam 40 to rotate counterclockwise with respect to FIGS. 3 through 8, and a biasing force in the same direction is also exerted on the release plate 50, which is made integral with the rotational cam 40 in the rotational direction.

The retaining ring 80 is an annular ring member made of metal. As shown in FIG. 10, the retaining ring 80 is put on the base plate 20 in a manner so as to be fitted on the outer peripheral surface of the large-diameter annular flange 22 of the base plate 20 and the left side surface of the small-diameter annular flange 61 of the ratchet plate 60 to be fixed to the base plate 20. In this state, the ratchet plate 60 is sandwiched between the base plate 20 and the retaining ring 80, and the ratchet plate 60 is rotatable relative to the base plate 20 and the retaining ring 80 along the inner peripheral surface of the large-diameter annular flange 22 without coming off the base plate 20 and the retaining ring 80.

The base plate 20 is fixed to the aforementioned right rear frame (not shown), which are elements of the seat cushion 11, and the ratchet plate 60 is fixed to the aforementioned right seatback frame (not shown), which are elements of the seatback 12. Therefore, the ratchet plate 60 rotates with the seatback 12.

An operating lever 90 (FIG. 1) which can be manually rotated is fixed to a side (the right side) of the seat reclining apparatus 15. A shaft 91 (FIG. 1) is inserted into the seat reclining apparatus 15 through the radial center thereof. The axis of the shaft 91 is substantially coincident with the rotational center of the ratchet plate 60. Manually rotating the operating lever 90 causes the shaft 91 to rotate on the axis thereof. The shaft 91 passes through the shaft insertion hole 21, the non-circular center hole 41, the center hole 51 and the shaft insertion hole 62; among these holes, the shaft 91 is engaged with the non-circular center hole 41 in a state of being prevented from rotating relative to the non-circular center hole 41. Therefore, when the shaft 91 rotates, the rotational cam 40 and the release plate 50 rotate with the shaft 91.

Operations of the seat reclining apparatus 15 will be hereinafter discussed with reference to FIGS. 3 through 8. In FIGS. 3 through 8, the pawls 30 and 31 and the rotational cam 40, which are positioned behind the ratchet plate 60, are shown by solid lines, whereas the release plate 50, which is positioned in front of the pawls 30 and 31 and the rotational cam 40, is imaginarily shown by one-dot chain lines. Although the most part of the second pawl 31B is not illustrated in FIGS. 3 through 8, the second pawl 31B operates in the same manner as the second pawl 31A.

The rotational operating range of the ratchet plate 60 (the seatback 12) in the seat reclining apparatus 15 can be roughly divided into two: a locked range in which the first holding projection 66 does not radially face the holding projection 32 of the first pawl 30 and an unlocked range in which the first holding projection 66 radially faces the holding projection 32 of the first pawl 30.

Figure 3:
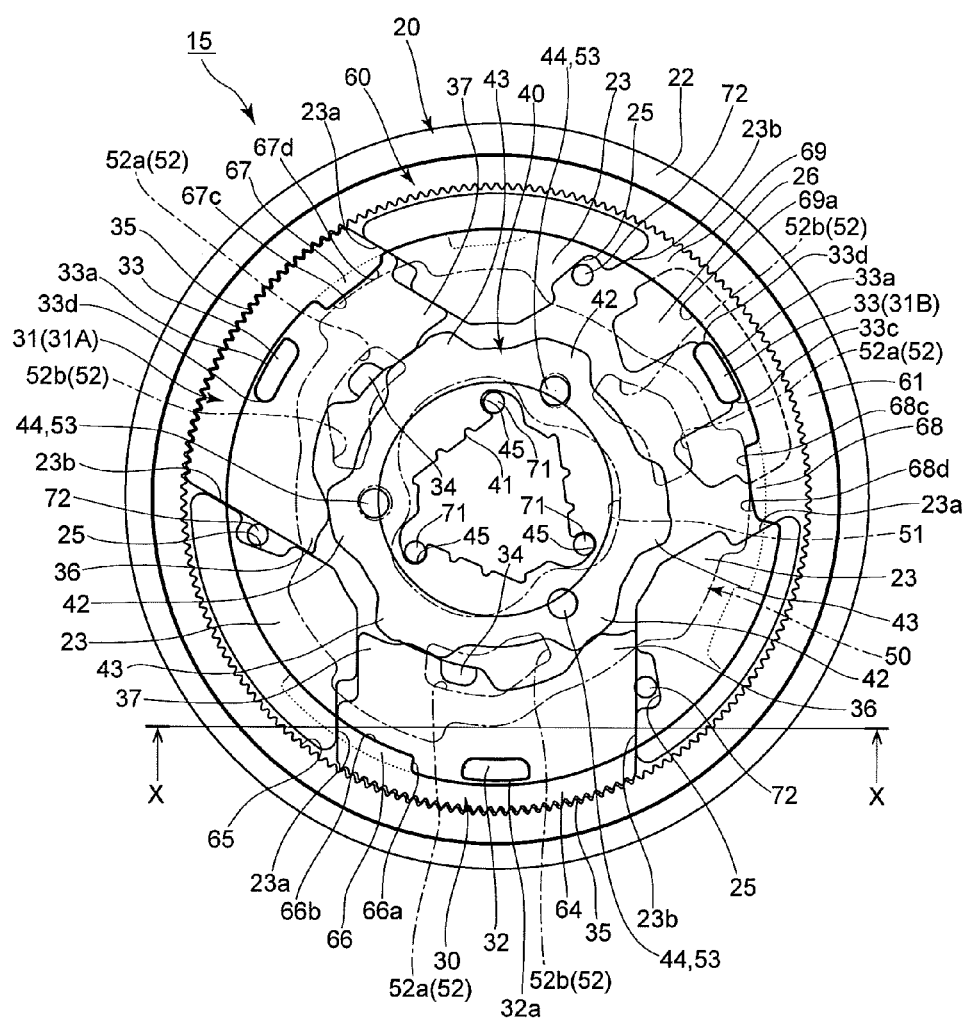
FIG. 3 is a side elevational view of the seat reclining apparatus in a state where a first pawl and a second pawl are in the engaged positions thereof in the locked range of a ratchet plate.

When no operating force is applied to the rotational cam 40 and the release plate 50 in the locked range of the ratchet plate 60 (the seatback 12), the seat reclining apparatus 15 is in the locked state shown in FIG. 3. The positions of the rotational cam 40 and the release plate 50 at this time are referred to as the locked positions. In the locked state, the rotational cam 40 and the release plate 50 are each held in the locked position by the biasing force of the lock springs 70 (which bias the rotational cam 40 and the release plate 50 counterclockwise with respect to FIG. 3). The pressed portions 37 of the first pawl 30 and the second pawls 31 are pressed radially outward (in the locking direction) by the pressing portions 43 of the rotational cam 40 which is held in the locked position.

In the locked range of the ratchet plate 60, the first pawl 30 can move to the engaged position without being restricted by the first holding projection 66 since the holding projection 32, which is provided on the first pawl 30, does not radially face the first holding projection 66 (the positions of these projections 32 and 66 in the circumferential direction are mutually different). Additionally, although the auxiliary holding projection 33 which is provided on the second pawl 31A is located at a position radially facing the first holding projection 66, the second pawl 31A can move to the engaged position with no restrictions by the first holding projection 66 because the auxiliary holding projection 33 is provided closer to the radially inner side than the holding projection 32. Although the auxiliary holding projection 33 which is provided on the second pawl 31B is located at a position radially facing the inner peripheral surface 69a of the connecting projection 69, the second pawl 31B can move to the engaged position with no restrictions by the connecting projection 69 because the auxiliary holding projection 33 is provided closer to the radially inner side than the holding projection 32. The first pawl 30 and the second pawls 31 (31A and 31B) which have been pressed radially outward by the rotational cam 40 are each held in the engaged position, in which the outer toothed portions 35 is in mesh with the internal gear 65 of the ratchet plate 60, which prevents the base plate 20 and the ratchet plate 60 from rotating relative to each other. Accordingly, the seatback 12 is prevented from tilting relative to the seat cushion 11. When the first pawl 30 is in the engaged position, the outer side surface 32a of the holding projection 32 is positioned closer to the radially outer side than the holding surface 66b of the first holding projection 66. When each of the two second pawls 31 is in the engaged position, the outer side surfaces 33a of the auxiliary holding projections 33 of the two second pawls 31 are positioned closer to the radially outer side than the holding surface 67c of the second holding projection 67 and the holding surface 68c of the third holding projection 68.

When the release plate 50 is in the locked position, the cam followers 34 of the first pawl 30 and the second pawls 31 are positioned in the lock-allowing portions 52a of the cam holes 52, so that the release plate 50 is not involved in the position setting of each pawl 30 and 31. In addition, during the movement of the first pawl 30 and the second pawls 31 toward the locked position or in the state where the first pawl 30 and the second pawls 31 are each held in the locked position, the restrictor portions 42 of the rotational cam 40 are not normally in contact with the restricted portions 36; the restrictor portions 42 and the restricted portions 36 come into contact with each other only when the first pawls 30 and the second pawls 31 tilt.

Rotating the operating lever 90 from the position shown by a solid line in FIG. 1 to the position shown by a two-dot chain line in FIG. 1 against the biasing force of each lock spring 70 in the locked range of the ratchet plate 60 (the seatback 12) causes the rotational cam 40 and the release plate 50 to rotate clockwise with respect to FIG. 3 (in the unlocking direction) via the shaft 91 (FIG. 1). When the release plate 50 rotates in the unlocking direction from the locked position, the cam follower 34 of each of the first pawl 30 and the second pawls 31 changes the position thereof in the associated cam hole 52, which is formed in the release plate 50, from the lock-allowing portion 52a to the unlocking portion 52b thereof. Thereupon, each cam follower 34 is pressed toward the radially inner side of the base plate 20 by the inner surface of the associated cam hole 52, which causes each of the first pawl 30 and the second pawls 31 to move in the associated guide groove 24 toward the radially inner side. At this time, the rotational cam 40 moves so as to move the pressing portions 43 in the direction opposite to the pressing direction against the first pawl 30 and the second pawls 31, thus not interfering with radially inward movements of the first pawl 30 and the second pawl 31 that are caused by the release plate 50.

Figure 4:
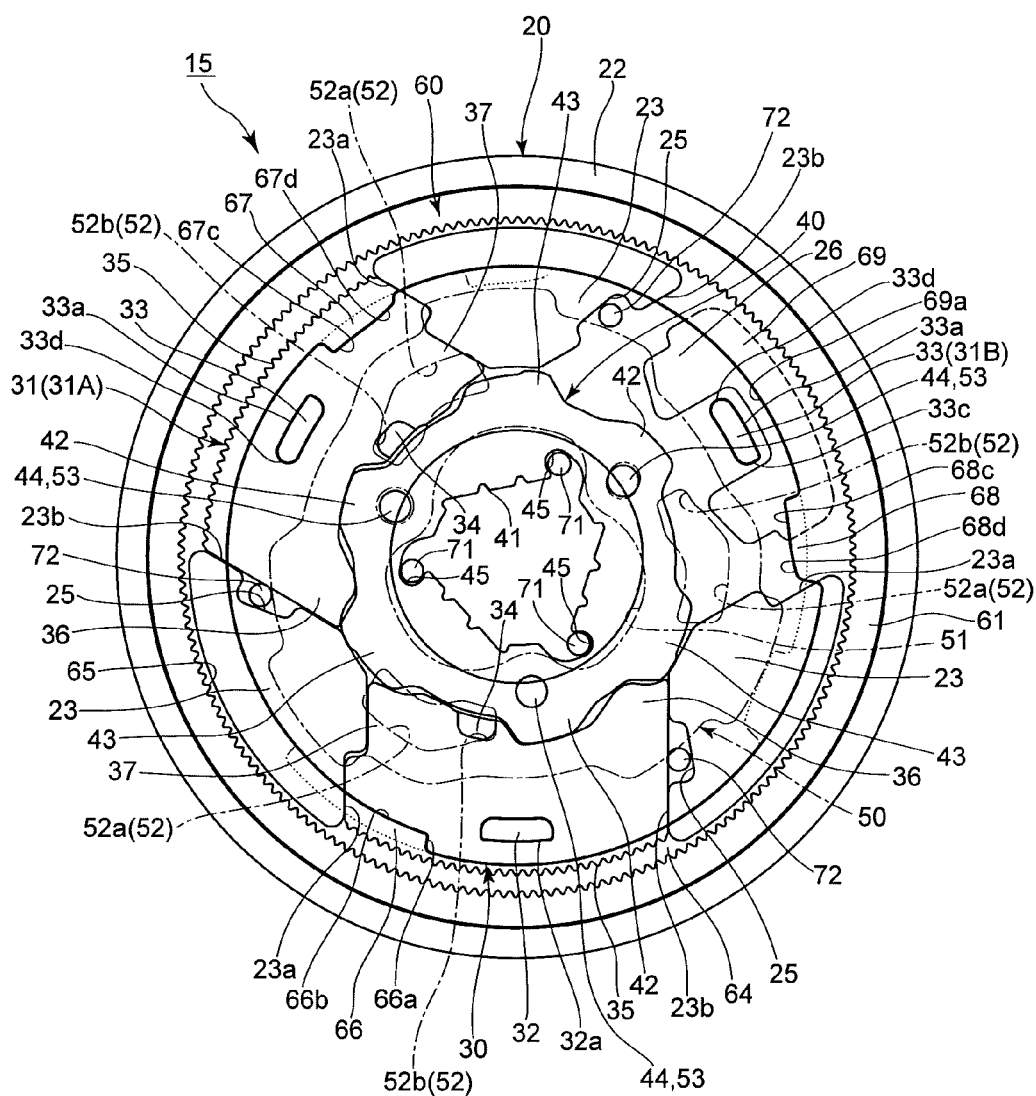
FIG. 4 is a side elevational view of the seat reclining apparatus in a state where the first pawl and the second pawl are in the disengaged positions thereof in the locked range of the ratchet plate.

Upon each of the rotational cam 40 and the release plate 50 rotating to the unlocked position shown in FIG. 4, each of the first pawl 30 and the second pawls 31 reaches the disengaged position, in which the outer toothed portion 35 of each pawl 30 and 31 is totally disengaged from the internal gear 65 of the ratchet plate 60. This disengagement of the outer toothed portion 35 of each pawl 30 and 31 from the internal gear 65 of the ratchet plate 60 allows the base plate 20 and the ratchet plate 60 to rotate relative to each other. Namely, the seat reclining apparatus 15 enters into an unlocked state, in which the seatback 12 can be tilted relative to the seat cushion 11. In this unlocked state, each restrictor portion 42 of the cam member 40 fits into a recess formed between the restricted portion 36 and the pressed portion 37 on the associated first or second pawl 30 or 31, and each pressing portion 43 of the cam member 40 fits into a space formed between two of the pawls 30 and 31 adjacent to each other, which makes it possible to move each of the first pawl 30 and the second pawls 31 to the disengaged position without being interfered by the cam member 40.

Upon releasing the operating lever 90 in the unlocked state shown in FIG. 4, the rotational cam 40 and the release plate 50 rotate counterclockwise toward the locked position (FIG. 3) from the unlocked position by the biasing force of each lock spring 70. This rotation of the cam ring 40 toward the locked position causes the pressing portions 43 to press the pressed portions 37 accordingly, thus causing each pawl 30 and 31 to move toward the outer peripheral side in the associated guide groove 24 to consequently reach the engaged position (FIG. 3).

Figure 5:
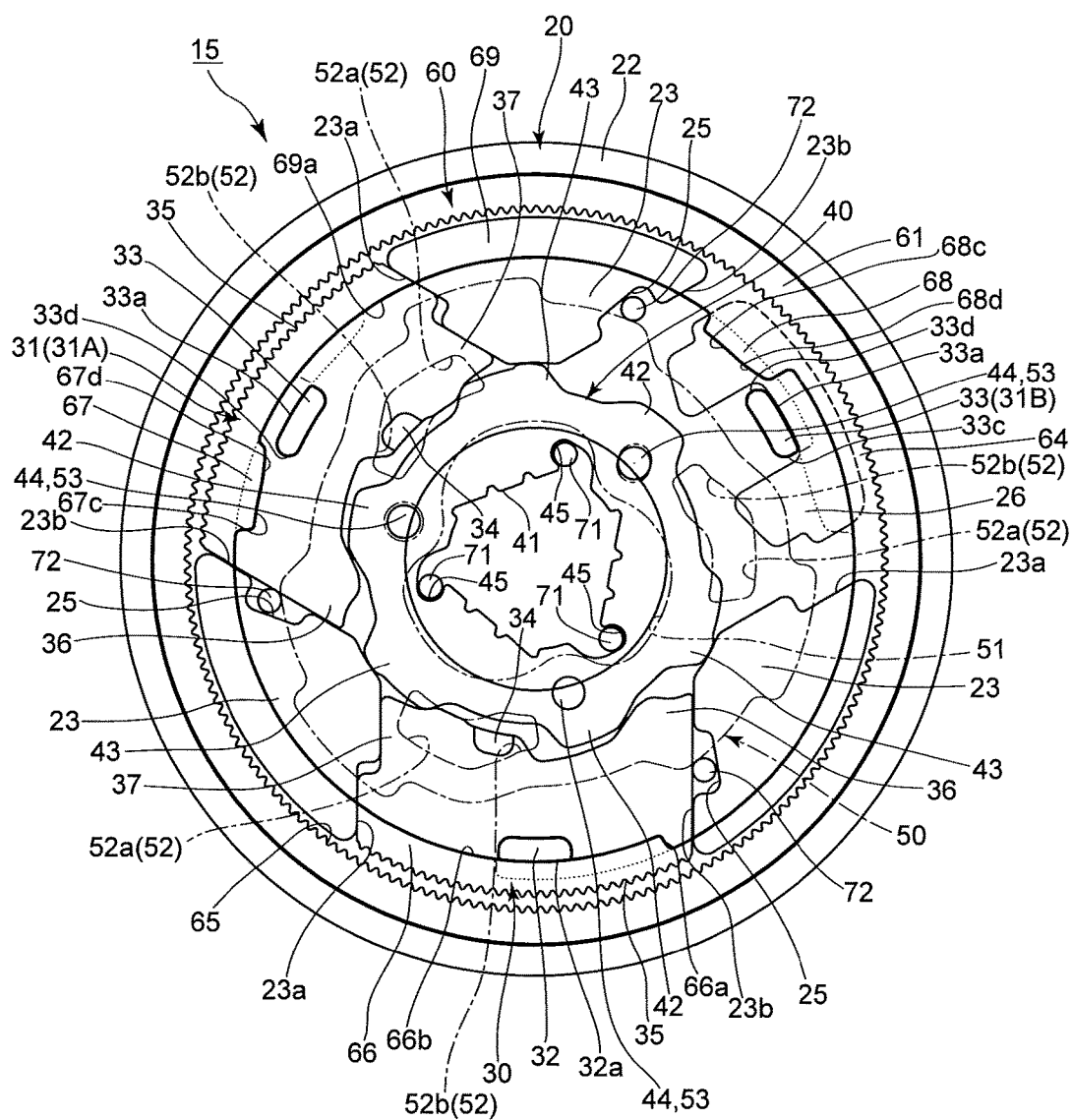
FIG. 5 is a side elevational view of the seat reclining apparatus in a state where a holding projection of the first pawl is in contact with a first holding projection in the unlocked range of the ratchet plate.

In the unlocked range of the ratchet plate 60 (the seatback 12), since the positional relationship between the holding projection 32, which is formed on the first pawl 30, and the first holding projection 66, which is formed on the ratchet plate 60, is such that the holding projection 32 and the first holding projection 66 radially face each other as shown in FIG. 5, the first pawl 30 is prevented from moving radially outward by engagement of the outer side surface 32a of the holding projection 32 with the holding surface 66b of the first holding projection 66. Accordingly, as is the case where the cam followers 34 have been pulled radially inward via the cam holes 52 as shown in FIG. 4, the first pawl 30 is held in the disengaged position, in which the outer toothed portion 35 thereof is disengaged from the internal gear 65 (see FIG. 5). By movement of the first pawl 30 being restricted, rotation of the rotational cam 40 in the locking direction (in a direction to press the first pawl 30 toward the radially outer side) is restricted, so that each second pawl 31 also stops at the position shown in FIG. 5 (the disengaged position, in which the outer toothed portion 35 thereof is not engaged from the internal gear 65). At this time, the cam follower 34 of each of the first pawl 30 and the second pawls 31 is not in contact with the inner surface of the associated cam hole 52, so that the release plate 50 is not involved in the position setting of each of the first pawl 30 and the second pawls 31. FIG. 5 shows a state where the ratchet plate 60 is positioned within the unlocked range at a position more than a predetermined amount away from the locked range. At this time, the auxiliary holding projection 33 of the second pawl 31 shown in FIG. 5 and the auxiliary holding projection 33 of the second pawl 31 not shown in FIG. 5 do not radially face the second holding projection 67 and the third holding projection 68 of the ratchet plate 60, respectively (the positions of the auxiliary holding projections 33 of the second pawls 31 in the circumferential direction are different from those of the second holding projection 67 and the third holding projection 68, respectively), so that the auxiliary holding projections 33 of the second pawls 31 are not in contact with the second holding projection 67 and the third holding projection 68, respectively.

In the unlocked range shown in FIG. 5, the outer toothed portions 35 of the first pawl 30 and the second pawls 31 are not in mesh with the internal gear 65 of the ratchet plate 60, so that the ratchet plate 60 can always rotate relative to the base plate 20. Namely, the seatback 12 can tilt even if the unlocking operation does not continue to be performed. The section ranging from the forwardly-tilted position 12A of the seatback 12 shown in FIG. 1 to a position immediately in front of the first-stage locked position 12C is the unlocked range, and the circumferential lengths of the holding projection 32 of the first pawl 30 and the first holding projection 66 of the ratchet plate 60 and the relative positions therebetween are set so as to maintain the radial face-to-face relationship over the unlocked range. Upon the seatback 12 being raised to the first-stage locked position 12C, the unlocked-state (a state in which the holding projection 32 and the first holding projection 66 radially face each other) is released, which causes the seat reclining apparatus 15 to be switched from the unlocked range to the locked range.

Figure 6:
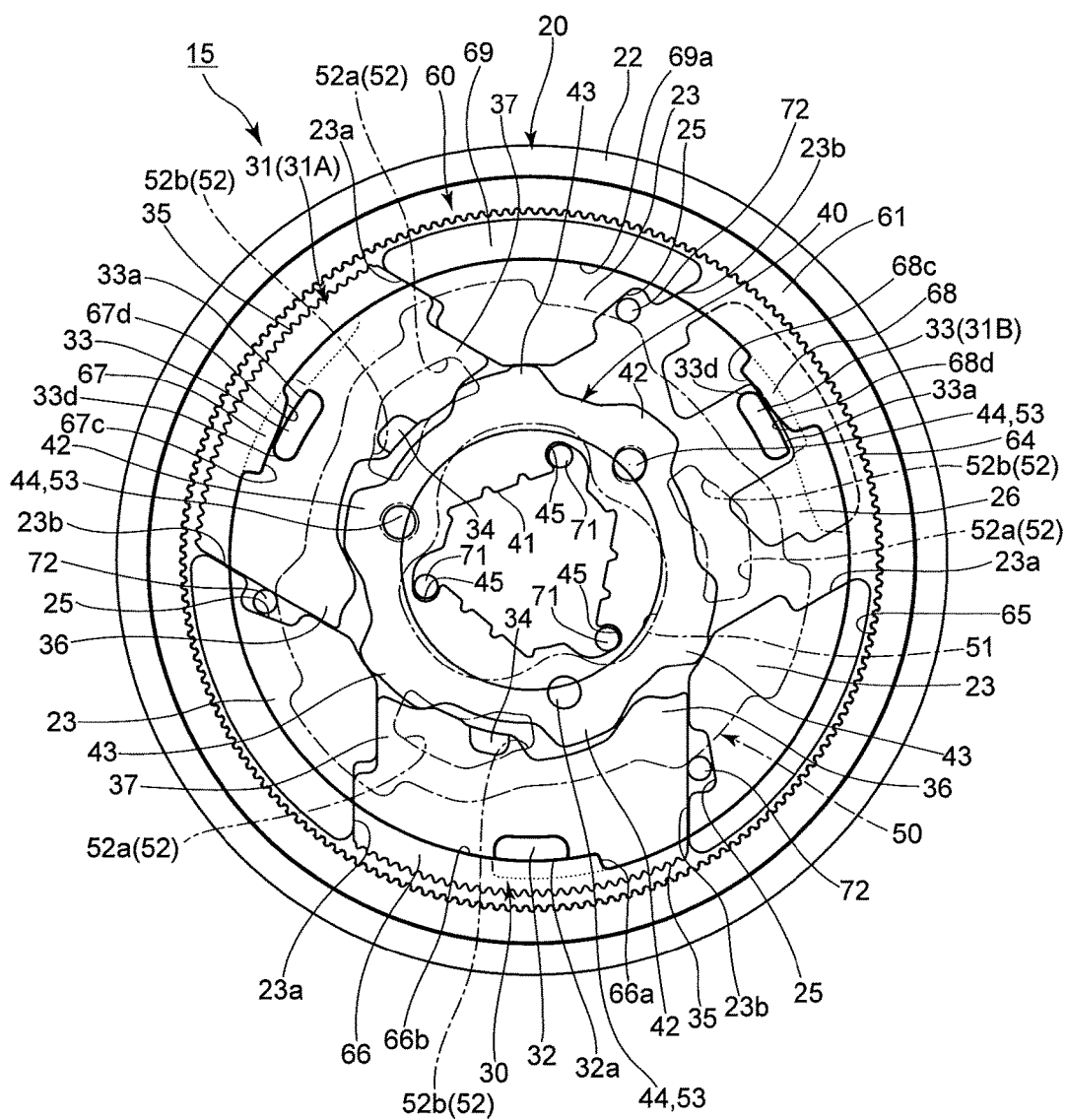
FIG. 6 is a side elevational view of the seat reclining apparatus in a state where an auxiliary holding projection of the second pawl faces a second holding projection in the unlocked range of the ratchet plate.

FIG. 6 shows a state where the ratchet plate 60 is in the specific range within the unlocked range thereof. In the state shown in FIG. 6, the whole of the outer side surface 32a of the holding projection 32 remains in contact with the holding surface 66b of the first holding projection 66 following the state shown in FIG. 5 though the step riser surface 66a of the first holding projection 66 has reached a point in the vicinity of the holding projection 32 of the first pawl 30. At this time, the auxiliary holding projection 33 of the second pawl 31A and the second holding projection 67 of the ratchet plate 60 radially face each other; however, a slight clearance exits between the outer side surface 33a of the auxiliary holding projection 33 and the holding surface 67c of the second holding projection 67, so that the auxiliary holding projection 33 and the second holding projection 67 are not in contact with each other. In FIG. 6, the auxiliary holding projection 33 of the second pawl 31B and the third holding projection 68 are similarly positioned relative to each other, so that the outer side surface 33a and the holding surface 68c radially face each other (without contacting each other) with a clearance therebetween.

Figure 7:
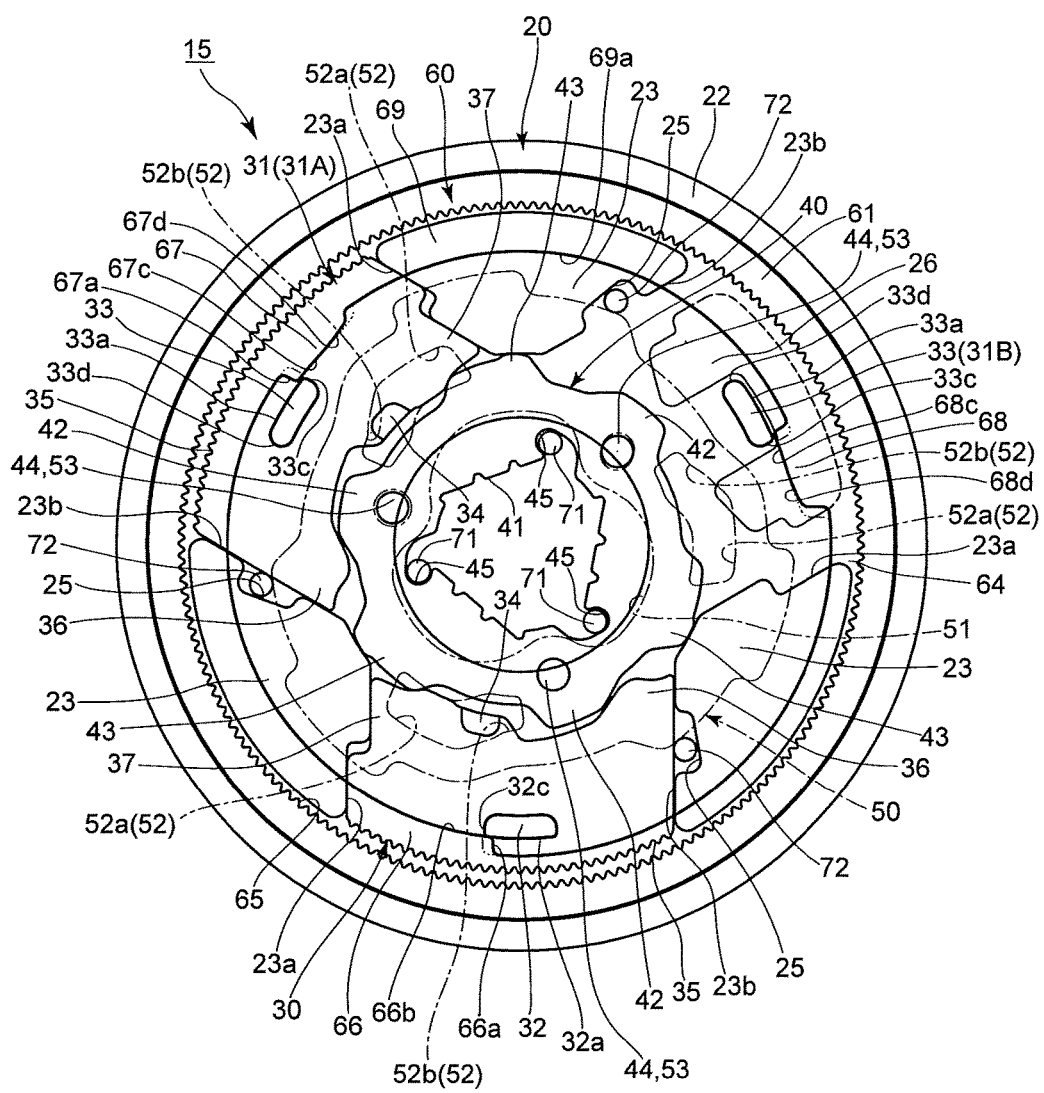
FIG. 7 is a side elevational view of the seat reclining apparatus immediately before the ratchet plate is switched from the unlocked range to the locked range.

FIG. 7 shows a state where the ratchet plate 60 has rotated to a position within the aforementioned specific range immediately before the contact of the first holding projection 66 with the holding projection 32 of the first pawl 30 is released (immediately before the ratchet plate 60 is switched from the unlocked range to the locked range). The step riser surface 66a of the first holding projection 66 has reached a point in the vicinity of the connecting surface 32c of the holding projection 32, and the contact area between the outer side surface 32a of the holding projection 32 and the holding surface 66b of the first holding projection 66 has become small. As for the auxiliary holding projection 33 of the second pawl 31A and the second holding projection 67, the step riser surface 67a of the second holding projection 67 has reached a point in the vicinity of the connecting surface 33c of the auxiliary holding projection 33, so that the area in which the auxiliary holding projection 33 and the second holding projection 67 radially face each other has become smaller than that in the state shown in FIG. 6; nevertheless, even in the state shown in FIG. 7 following the state shown in FIG. 6, the outer side surface 33a and the holding surface 67c of the second holding projection 67 remain positioned relative to each other to radially face each other. In FIG. 7, the auxiliary holding projection 33 of the second pawl 31B and the third holding projection 68 are similarly positioned relative to each other, so that the outer side surface 33a and the holding surface 68c remain facing each other radially (without contacting each other) with a clearance therebetween.

In the specific range of the ratchet plate 60 shown in FIGS. 6 and 7, the cam follower 34 of each of the first pawl 30 and the second pawls 31 is not in contact with the inner surface of the associated cam hole 52, so that the release plate 50 is not involved in the position setting of each of the first pawl 30 and the second pawls 31.

In the unlocked range shown in FIGS. 5 through 7, the unlocked state, in which each outer toothed portion 35 and the internal gear 65 are not engaged with each other, is maintained by contact of the holding projection 32 of the first pawl 30 with the first holding projection 66. In this unlocked range, it is sometimes the case that a load tending to move each pawl 30 and 31 radially outward such as a force which rotates the rotational cam 40 in the locking direction is exerted. In the state where the whole of the outer side surface 32a of the holding projection 32 is in contact with the holding surface 66b of the first holding projection 66 as shown in FIGS. 5 and 6, the mutual contact area is large and thus the load bearing performance is high; accordingly, even if a heavy load which presses the first pawl 30 radially outward is exerted, the first pawl 30, which includes the holding projection 32, and the ratchet plate 60, which includes the first holding projection 66, are not easily deformed. On the other hand, if the contact area between the holding projection 32 and the first holding projection 66 becomes small as shown in FIG. 7, which shows a state immediately before the unlocked range is switched to the locked range, there is a possibility of a portion around the holding projection 32 and a portion around the first holding projection 66 being deformed by a heavy load which presses the first pawl 30 radially outward. In this state, since the auxiliary holding projections 33 of the second pawls 31 radially face the second holding projection 67 and the third holding projection 68 as shown in FIG. 7, in the case where the first pawl 30 or the first holding projection 66 is deformed by a heavy load in the radially outward direction, the auxiliary holding projection 33 of one or each second pawl 31 which also receives the load in the radially outward direction comes into contact with the second holding projection 67 and/or the third holding projection 68, which makes it possible to prevent each second pawl 31 from moving radially outward (namely, to maintain the unlocked state).

Figure 8:
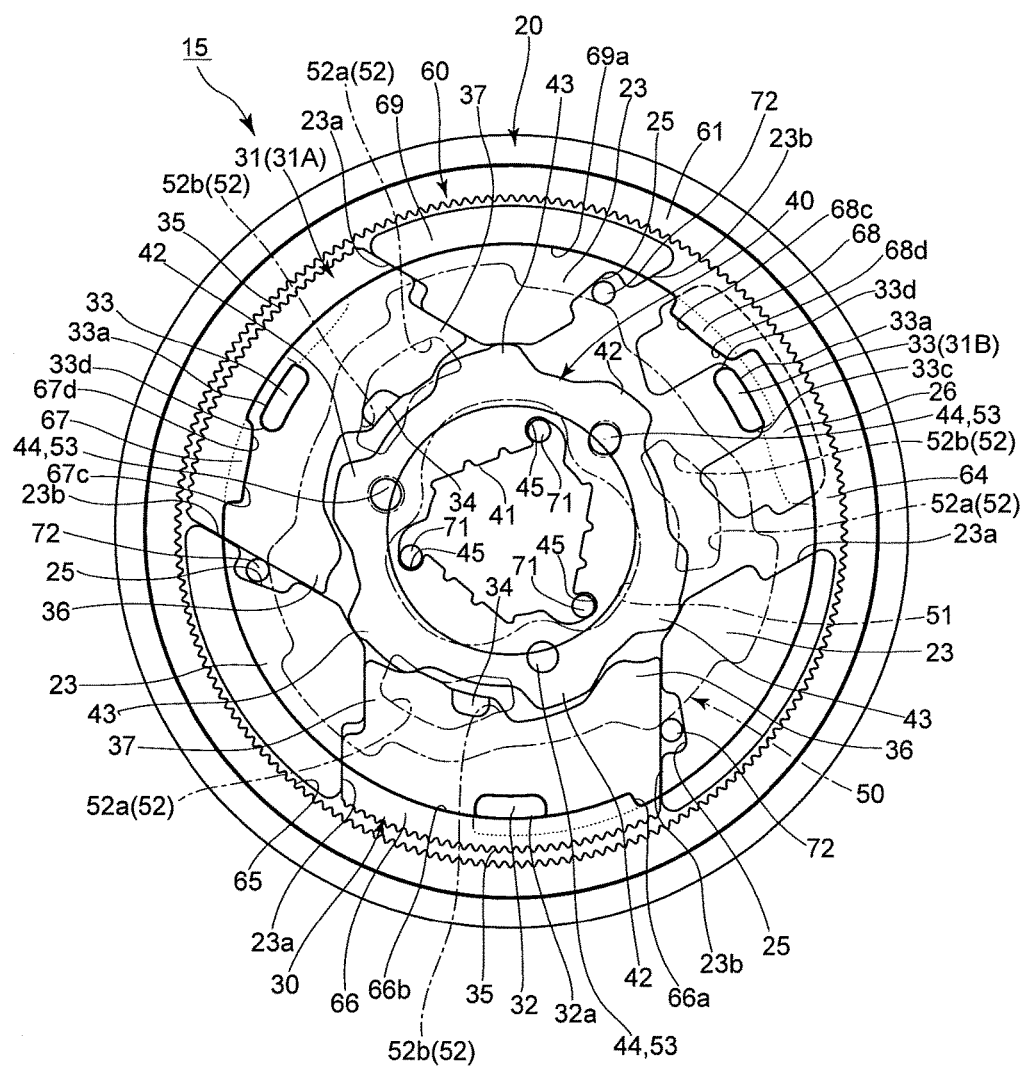
FIG. 8 is a side elevational view of the seat reclining apparatus in a state where the second pawl has moved radially outward from the state shown in FIG. 5.
Figure 9:
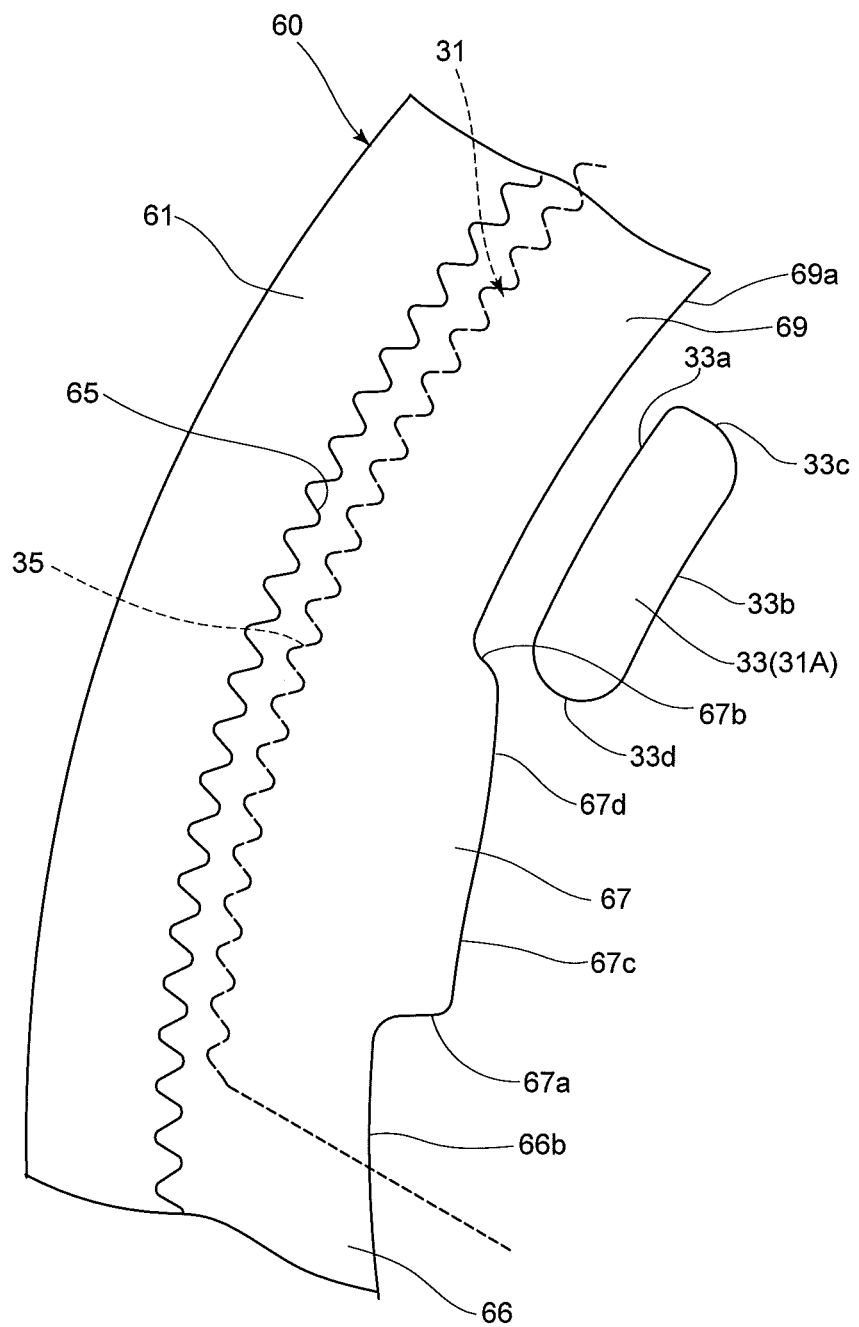
FIG. 9 is an enlarged view illustrating the positional relationship between the auxiliary holding projection and the second holding projection in the state shown in FIG. 8.

The circumferential lengths of the second holding projection 67 and the third holding projection 68 of the ratchet plate 60 are set to be smaller than the of the first holding projection 66 so that each of the second holding projection 67 and the third holding projection 68 radially faces the associated auxiliary holding projection 33 only in a specific range (FIGS. 6 and 7) within the unlocked range of the ratchet plate 60 which is close to the switching position between the unlocked range and the locked range. Therefore, in the unlocked range of the ratchet plate 60 except the specific range, there is room for the auxiliary holding projection 33 of each second pawls 31 to move radially outward beyond the position of the holding surface 67c of the second holding projection 67 or the position of the holding surface 68c of the third holding projection 68 (to a position where the auxiliary holding projection 33 of each second pawl 31 radially overlaps the second holding projection 67 or the third holding projection 68). FIGS. 8 and 9 show the case where the second pawls 31 have moved radially outward from the state shown in FIG. 5 due to vibrations, gravity, etc. Each second pawl 31 is prevented from moving radially outward beyond the position shown in FIGS. 8 and 9 by contact of the associated cam follower 34 with the inner surface of the associated cam hole 52 (the lock release portion 52b thereof) of the release plate 50. At the position shown in FIGS. 8 and 9, the outer toothed portion 35 of each second pawl 31 is not in mesh with the internal gear 65 of the ratchet plate 60, so that the unlocked state is maintained.

Since the radial position of each auxiliary holding projection 33 shown in FIGS. 8 and 9 partly overlaps the radial position of the second holding projection 67 (the third holding projection 68), rotation of the ratchet plate 60 in the clockwise direction (toward the locked range) from the state shown in FIGS. 8 and 9 causes the second holding projection 67 (the third holding projection 68) and an end (the connecting surface 33d) of the auxiliary holding projection 33 to come in contact with each other. In this state, the positional relationship between the second holding projection 67 (the third holding projection 68) and the auxiliary holding projection 33 is set such that the pressing surface 67d (the pressing surface 68d) comes in contact with the connecting surface 33d of the auxiliary holding projection 33 as shown in FIGS. 8 and 9. Therefore, rotation of the ratchet plate 60 causes a component of force which presses the auxiliary holding projection 33 radially inward (toward the disengaged position) from the force of the ratchet plate 60 in the rotational direction to be produced due to the inclined shape of the pressing surface 67d (the pressing surface 68d), which allows the ratchet plate 60 to rotate while pressing the second pawls 31 radially inward. In other words, even when each second pawl 31 changes the position thereof radially outward so that the auxiliary holding projection 33 becomes radially overlapping the second holding projection 67 (the third holding projection 68) when the ratchet plate 60 is in the unlocked range, the ratchet plate 60 can rotate with no restrictions by the auxiliary holding projections 33. In addition, each second pawl 31 can be pressed and moved more smoothly because the connecting surface 33d thereof, which is a portion of the auxiliary holding projection 33 which comes in contact with the second holding projection 67 (the third holding projection 68), is formed into a circular-arc-shaped curved surface.

As described above, in the seat reclining apparatus 15, the state (shown in FIGS. 5 through 8) in which the first holding projection 66 of the ratchet plate 60 and the holding projection 32 of the first pawl 30 are positioned to face each other radially corresponds to the unlocked range. In a specific range within the unlocked range in the vicinity of the boundary between the unlocked range and the locked range, the auxiliary holding projections 33 of the second pawls 31 face the second holding projection 67 and the third holding projection 68, respectively, which makes it possible to enhance load bearing performance. Although the auxiliary holding projections 33 of the second pawl 31A and the second pawl 31B radially face the first holding projection 66 and the connecting projection 69 respectively in the locked range (FIGS. 3 and 4), the formation of each auxiliary holding projection 33 at a position closer to the radially inner side than the holding projection 32 allows each second pawl 31 (31A, 31B) to move to the engaged position without being restricted by the first holding projection 66 and the connecting projection 69. Accordingly, the circumferential length of the first holding projection 66 corresponds to the unlocked range of the ratchet plate 60, and this circumferential length of the first holding projection 66 can be set without consideration given to interference with the auxiliary holding projections 33 of the second pawls 31 (especially, the second pawls 31A). As a result, it is possible to increase the range of movement of the ratchet plate 60 in the rotational direction (the operating amount of the seatback 12) while improving the strength by providing the plurality of pawls 30 and 31 with the holding projection 32 and the auxiliary holding projections 33, which are for imposing restrictions on radial movements of the plurality of pawls 30 and 31.

On top of that, the seat reclining apparatus 15 has a structure (the pressing surface 67d, the pressing surface 68d and the connecting surface 33d) which presses and moves each second pawl 31 toward the disengaged position in accordance with rotation of the ratchet plate 60 toward the specific range when the second pawls 31, which do not receive restrictions on radial movements of the auxiliary holding projections 33 in the major part of the unlocked range, move to positions at which the auxiliary holding projections 33 radially overlap the second holding projection 67 and the third holding projection 68, respectively. This makes it possible to allow the ratchet plate 60 to rotate from the unlocked range to the locked range with reliability without regard to the radial position of each second pawl 31 in the unlocked range, thus ensuring reliable and smooth operation.

Although the present invention has been described based on the above illustrated embodiment, the present invention is not limited to this particular embodiment; various modifications to the above illustrated embodiment are possible.

For instance, in the present embodiment of the seat reclining apparatus 15, each second pawl 31 receives restrictions on radially outward movement thereof from the associated cam hole 52 in the unlocked range and thus does not move radially outward beyond the position shown in FIG. 8. In addition, the radial positions of the pressing surface 67d of the second holding projection 67 and the pressing surface 68d of the third holding projection 68 (the projecting amounts of the standing wall surfaces 67b and 68b in the intermediate annular portion 64) are set to correspond to the radial positions of the second pawls 31 shown in FIG. 8. In the case where each second pawl 31 is allowed to move radially outward beyond the position thereof shown in FIG. 8 in the unlocked range (within the range in which the outer toothed portion 35 thereof does not mesh with the internal teeth 65), it is advisable that the pressing surface 67d and the pressing surface 68d be accordingly extended radially outwards.

Although the second holding projection 67 and the third holding projection 68 of the ratchet plate 60 are provided with the pressing surface 67d and the pressing surface 68d, respectively, which are each formed as an inclined surface in the illustrated embodiment, each second pawl 31 can be provided, at an end of the auxiliary holding projection 33 in the longitudinal direction thereof (a portion of the auxiliary holding projection 33 which corresponds to the connecting surface 33d), with an inclined surface corresponding to the pressing surface 67d or 68d. In addition, each of the second holding projection 67 and the auxiliary holding projection 33 of the associated second pawl 31 (31A) can be provided with an inclined surface corresponding to the pressing surface 67d and each of the third holding projection 68 and the auxiliary holding projection 33 of the associated second pawl 31 (31B) can be provided with an inclined surface corresponding to the pressing surface 68d. According to either of these configurations also, a force which presses each second pawl 31 radially inward can be given when the ratchet plate 60 is rotated into a specific range in the unlocked range.

Although the radial positions of the second holding projection 67 and the third holding projection 68 of the ratchet plate 60 are made identical in the illustrated embodiment, the radial positions of the second holding projection 67 and the third holding projection 68 can be made mutually different. For instance, it is possible to adopt a configuration in which the third holding projection 68 is made greater in projecting amount toward the radially inner side than the second holding projection 67 to make the first holding projection 66, the second holding projection 67 and the third holding projection 68 mutually different in radial position (the positions of the holding surfaces 66b, 67c and 68c, which face radially inward) in three stages. In this case, the position of the auxiliary holding projection 33 of one of the two second pawls 31 (i.e., the second pawl 31B) is changed, being shifted toward the radially inner side according to the radial position of the third holding projection 68. Even with this configuration, the above described effects obtained in the seat reclining apparatus 15 can be obtained.

Although the auxiliary holding projections 33, which are provided on the second pawls 31, in the illustrated embodiment are formed so that the longitudinal direction of each auxiliary holding projection 33 extends in the rotational direction of the ratchet plate 60, the longitudinal direction of each auxiliary holding projection 33 can be changed so as to extend in, e.g., a radial direction. It is also possible to form each auxiliary holding projection 33 into a cylindrical columnar shape or the like having no specific longitudinal direction. In either configuration, it is desirable to set the arrangement of the auxiliary holding projections 33 so that the auxiliary holding projections 33 radially face the second holding projection 67 and the third holding projection 68 with the contact area between the holding projection 32 and the first holding projection 66 becomes minimum as shown in FIG. 7.

The radial movement of each pawl in the present invention is not limited to linear movement. For instance, although the first pawl 30 and the second pawls 31 in the illustrated embodiment are configured to move linearly in the radial direction relative to the base plate 20, the present invention is also applicable to a configuration in which each pawl moves along a circular-arc-shaped moving path which includes a radial motion component and a circumferential motion component.

Although each of the first pawl 30 and the second pawls 31 is moved between the engaged position and the disengaged position using a combination of the rotational cam 40 and the release plate 50 in the seat reclining apparatus 15 in the illustrated embodiment, each pawl 30 and 31 can be driven by a driving member (s) other than the cam ring 40 and the release plate 50. In terms of space efficiency and driving efficiency, it is desirable to use an element(s) like the rotational cam 40 and/or the release plate 50 that rotates about the same rotational center as the ratchet plate 60; however, it is possible to use an element(s) which moves in a different operating manner such as linear motion. In addition, it is also possible to use a driving member made of an integrated combination of the rotational cam 40 and the release plate 50.

Inversely to the structure of the seat reclining apparatus 15 in the above illustrated embodiment, the base plate 20 and the ratchet plate 60 can be fixed to a frame on the seatback 12 side and a frame on the seat cushion 11 side, respectively.

Among all the left and right frames provided as elements of the seat cushion 11 and the seatback 12, the rear frame and the seatback frame on the right side facing forward are connected via the seat reclining apparatus 15 in the above illustrated embodiment; however, the frames on the left side facing forward can be connected via the seat reclining apparatus 15. Additionally, it is possible to connect the frames on the right side to each other via the right seat reclining apparatus 15, connect the frames on the left side to each other via a left seat reclining apparatus 15 and connect the rotational cam 40 of the right seat reclining apparatus 15 and the rotational cam 40 of the left seat reclining apparatus 15 to each other via a connecting pipe, or the like, so that the left and right seat reclining apparatuses 15 move in synchronization with each other.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A seat reclining apparatus comprising:
   a base member provided on one of a seat cushion and a seatback;
   a ratchet provided on the other of said seat cushion and said seatback, provided with an internal gear and allowed to rotate relative to said base member;
   a first pawl which is supported to be movable relative to said base member in a radial direction about a rotation center point of said ratchet and moves between an engaged position, in which said first pawl is engaged with said internal gear, and a disengaged position, in which said first pawl is disengaged from said internal gear, said first pawl including a first limit portion; and
   a second pawl which is supported to be movable relative to said base member in a radial direction about said rotation center point of said ratchet and moves between an engaged position, in which said second pawl is engaged with said internal gear, and a disengaged position, in which said second pawl is disengaged from said internal gear, said second pawl including a second limit portion,
   wherein said ratchet comprises a first pawl-restriction portion which restricts movement of said first pawl to said engaged position by contact with said first limit portion and a second pawl-restriction portion which restricts movement of said second pawl to said engaged position by contact with said second limit portion,
   wherein said second limit portion is positioned closer to a radially inner side than said first limit portion and said second pawl-restriction portion is positioned closer to said radially inner side than said first pawl-restriction portion,
   wherein, in an unlocked range in which said ratchet can always rotate relative to said base member with said first pawl-restriction portion and said first limit portion radially facing each other, said second pawl-restriction portion and said second limit portion radially face each other in a specific range that is a portion of said unlocked range, and
   wherein at least one of said second-pawl restriction portion and said second limit portion comprises a pressing portion which moves said second pawl to said disengaged position when said one of said second pawl-restriction portion and said second limit portion comes in contact with the other of said second pawl-restriction portion and said second limit portion in a rotational direction of said ratchet.

2. The seat reclining apparatus according to claim 1, wherein said pressing portion is an inclined surface provided on said second pawl-restriction portion.

3. The seat reclining apparatus according to claim 2, wherein said second pawl-restriction portion comprises a holding surface which holds said second pawl in said disengaged position and a standing wall surface for positioning said holding surface closer to said radially inner side than said first pawl-restriction portion, and
   wherein said inclined surface is provided between said holding surface and said standing wall surface.

4. The seat reclining apparatus according to claim 2, wherein said second limit portion is a projection projecting from said second pawl and comprises a circular-arc-shaped surface on a surface of said second limit portion which comes in contact with said inclined surface.

* * * * *